United States Patent

Yenisey

[15] 3,675,048

[45] July 4, 1972

[54] PULSE CIRCUIT FOR CONTROLLING PULSE DURATION

[72] Inventor: Osman Metin Yenisey, Rockaway, N.J.

[73] Assignee: Bell Telephone Laboratories, Incorporated, Murray Hill, N.J.

[22] Filed: June 28, 1971

[21] Appl. No.: 157,411

[52] U.S. Cl. ..............................307/261, 307/265, 307/274, 307/284, 307/288

[51] Int. Cl. ....................H03k 5/04, H03k 5/13, H03k 3/284

[58] Field of Search .............307/252 W, 260, 261, 264, 265, 307/266, 267, 268, 273, 274, 284, 288

[56] References Cited

UNITED STATES PATENTS

| | | | |
|---|---|---|---|
| 2,901,639 | 8/1959 | Woll | 307/265 |
| 3,204,130 | 8/1965 | Hickey | 307/268 |
| 3,282,632 | 11/1966 | Arsem | 307/273 X |
| 3,309,528 | 3/1967 | Ziegler | 307/274 X |
| 3,372,683 | 3/1968 | Phillips et al. | 307/284 X |
| 3,473,044 | 10/1969 | Moriyasu | 307/260 X |
| 3,553,495 | 1/1971 | Shaugnessy | 307/284 |

*Primary Examiner*—Donald D. Forrer
*Assistant Examiner*—L. N. Anagnos
*Attorney*—R. J. Guenther et al.

[57] ABSTRACT

A two-transistor pulse circuit generates an output pulse or a series of output pulses of predetermined duration from the collector of the first transistor. The number of output pulses depends upon the duration of a trigger current applied to the base of the first transistor. The second transistor aids the first transistor in switching by drawing its collector current through a capacitor connected to the base circuit of the first transistor. When the collector current of the second transistor charges the capacitor to a predetermined level, a voltage-sensitive switch discharges the capacitor through the first transistor to turn it off and end the output pulse. A modified version of the circuit is used to generate an output pulse with an energy content independent of power supply voltage variations.

7 Claims, 2 Drawing Figures

INVENTOR
O. M. YENISEY
BY David P. Kelley
ATTORNEY

PULSE CIRCUIT FOR CONTROLLING PULSE DURATION

BACKGROUND OF THE INVENTION

This invention relates to electrical pulse circuitry and, more particularly, to pulse generators which include means for controlling the output pulse width.

In signaling circuitry, it is often desirable for signaling purposes to produce electrical pulses of a known or controlled characteristic with a clean waveshape when triggered by a current from a remote source. The conventional technique of generating pulse signals of a predetermined width involves the use of blocking oscillators. Although the basic blocking oscillator circuit is simple, to overcome difficulties inherent in the operation of blocking oscillators additional circuitry is required, which unduly increases the circuit complexity and often compromises performance in some manner. Some of the difficulties encountered in the operation of blocking oscillators are: susceptibility to noise, pulse width dependence upon transistor gain, sensitivity to power supply voltage fluctuations, and nonstability with respect to temperature and load impedances. It would be desirable to have a simple and reliable circuit which is devoid of these operating difficulties.

SUMMARY OF THE INVENTION

In a first illustrative embodiment of the present invention, two transistors are arranged in a circuit such that the application of a triggering current to the base of the first transistor activates the second transistor that has its base connected in the collector circuit of the first transistor. The collector current of the second transistor, upon being turned on, forward-biases the base of the first transistor through a capacitor and drives it into saturation. An output pulse signal whose duration is equal to the conduction state of the first transistor is obtained from the collector circuit of the first transistor. The capacitor which is connected between the collector of the second transistor and the base of the first transistor develops a potential as it is charged by the collector current of the second transistor. A voltage-sensitive switch discharges the capacitor at a predetermined potential through the base-emitter junction of the first transistor, thereby rendering the first transistor nonconductive. The length of the charging time of the capacitor required to each the predetermined potential is controlled by the charging rate or collector current of the second transistor. As a result, the duration of the output pulse is controlled by the interaction of the two transistors through the capacitor and the voltage-sensitive switch which discharges the capacitor to turn off the first transistor.

In a second illustrative embodiment, the same basic circuit arrangement is used, with slight modifications, to improve the efficiency and noise immunity of the circuit. These modifications comprise an output pulse transformer to match the output impedance of the circuit to the impedance of the load and a voltage-sensitive switch in the trigger circuit to insure proper circuit operation for distorted triggering waveforms. The operation of the second embodiment provides an output pulse with a constant energy content that is independent of the power supply voltage.

It is a feature of the present invention that a voltage-sensitive switch discharges a capacitor through a first transistor to provide an output pulse which has its duration determined by the charging characteristic of the capacitor provided by a second transistor.

This and other features of the invention will become apparent from the following detailed description, taken in conjunction with the accompanying drawings.

DETAILED DESCRIPTION

Figure 1:
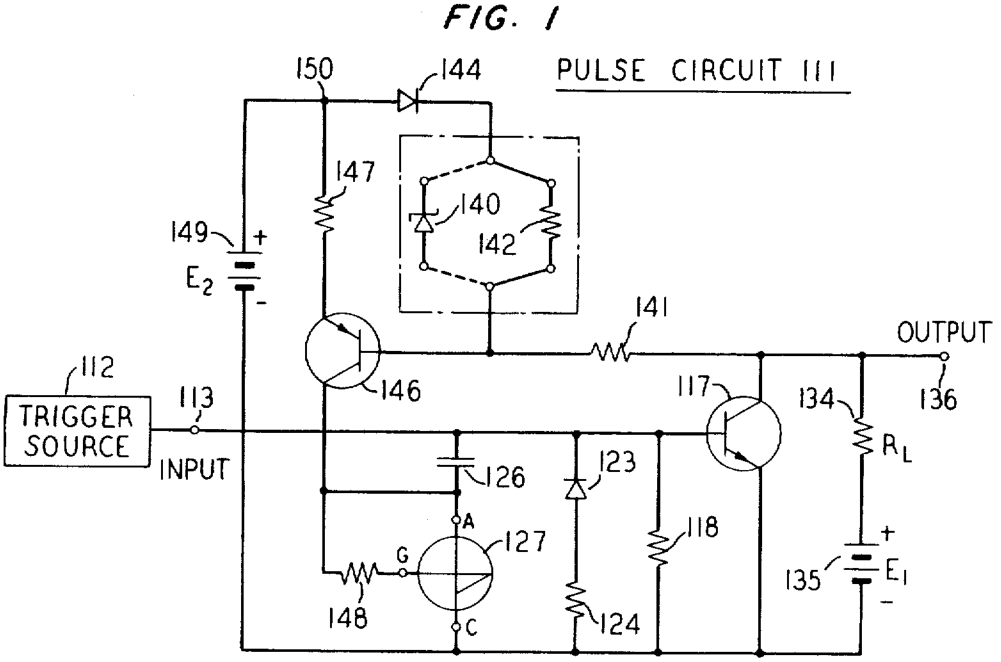
FIG. 1 is a first illustrative embodiment of a basic pulse circuit of the invention.

In FIG. 1, a trigger source 112, which may take any of a number of forms, is shown connected to an input terminal 113 of a pulse circuit 111. The input terminal 113 is connected to the base of a first transistor 117. To the input terminal 113, between the base and emitter of the transistor 117, are connected in parallel a resistor 118, a diode 123 in series with a resistor 124, and a capacitor 126 connected in series with a voltage-sensitive switch 127. The collector of the transistor 117 is connected through a resistor 134 to a potential source 135 shown schematically as a battery. The other terminal of potential source 135 is connected to the emitter of the transistor 117. A resistor 141 is connected from the collector of the transistor 117 through a resistor 142 and a diode 144 to a junction 150. Resistor 141 is also connected to the base of a second transistor 146. The emitter of the transistor 146 is connected through a resistor 147 to the junction 150 and a second potential source 149. The collector of the transistor 146 is connected to the capacitor 126 and through a resistor 148 to the voltage-sensitive switch 127.

In operation, the trigger source 112 supplies a triggering current to the base of the transistor 117. The transistor 117, which is normally off, begins to conduct in response to the triggering current and draws a collector current through resistors 134 and 141. The output signal or pulse is obtained at output terminal 136 from the collector of the transistor 117 as most of the collector current is drawn through the resistor 134. The remaining portion of the collector current is drawn through the resistor 141 from the potential source 149 through the resistor 142 which is connected in series with the diode 144. In lieu of resistor 142, a voltage regulator diode 140, shown connected in dashed lines, may be used. Either the voltage regulator diode 140 or the resistor 142 determines the duration of the output pulse from the pulse circuit 111. The effect of each of the components shall be explained after an initial explanation of the circuit operation. The remaining portion of the current flowing through the resistor 141 is drawn through the emitter-base junction of the transistor 146 and the resistor 147. The transistor 146 which was previously off is turned on by the combined effect of the emitter-base junction current in the transistor 146 and the voltage potential developed mainly by the resistor 142. The newly developed collector current of the transistor 146 is drawn through the capacitor 126, which is connected to the base of the transistor 117, and develops a potential across the terminals of the capacitor 126. The effect of the collector current of transistor 146 is to increase the potential of the forward-bias applied to the transistor 117. Thus, the switching speed of the transistor 117 increases as it goes into saturation.

With both transistors 117 and 146 conducting, the potential across the capacitor 126, in a small interval of time, reaches a predetermined critical voltage of the voltage-sensitive switch 127. At this time, the voltage-sensitive switch 127 becomes conductive and discharges the capacitor 126 through the three parallel branches in the emitter-base circuit of the transistor 117. The discharge current of the capacitor 126 develops a polarity reversal of the potential across the resistor 118 which is in parallel with the series combination of the diode 123 and the resistor 124. The polarity reversal of the bias potential turns the transistor 117 off. The collector current from the transistor 117 rapidly ceases and fails to sustain the conduction of the transistor 146.

As was pointed out in the foregoing, either the resistor 142 or the voltage regulator diode 140 may be connected in series with diode 144. When the voltage regulator diode 140 is used as the circuit option, the potential drop across the voltage regulator diode 140 and the slight potential drop across forwardly biased diode 144 are independent of variations in the voltage of the potential source 149. In other words, the potential developed across the voltage regulator diode 140 is equal to its reverse bias break-down potential. Also, the forward-bias potential across the emitter-base junction of the transistor 146 is equal to the forward-bias voltage drop across the diode 144 since the forward-bias potential across a junction varies relatively little as the current through it changes. Furthermore, by loop analysis it can be seen that the reverse-bias potential across the voltage regulator diode 140 determines the potential across the resistor 147 and, hence, the current drawn through that resistor. The emitter current drawn through the resistor 147 is substantially equal to the collector current of the transistor 146 and provides a constant current which determines the rate of charge on the capacitor 126. The diode 144 provides temperature tracking with the emitter-base junction of the transistor 146. Additional temperature stability, for example, can be achieved by using a temperature-compensated voltage regulator diode for the diode 140. The overall effect of the foregoing circuitry is to control the duration of the output pulse from the pulse circuit by controlling the charging rate of the capacitor 126. As can be appreciated, if the charging rate of the capacitor 126 remains constant and independent of voltage fluctuations of the potential source 149, the duration of the output pulse will also be constant due to the fact that the capacitor is discharged at a predetermined level by the voltage-sensitive switch 127 to terminate the conduction state of the transistor 117.

The voltage-sensitive switch 127 may, for example, be a three-terminal integrated circuit which has an anode, a gate and a cathode terminal, and performs a function similar to a two-terminal four-layer diode switching device. When a three-terminal device is used, the resistor 148 is connected between the gate terminal and the anode terminal of the voltage-sensitive switch to control its holding current value and switching characteristics. The holding current is the minimum value of current passing through the voltage-sensitive switch 127 necessary to maintain the conduction state. In other words, if the current falls below the holding current, the device switches back into the nonconductive state. These fairly new integrated circuits are known as unilateral switches. In actual practice, any one of a number of two-terminal switching devices may be used as the voltage-sensitive switch 127 provided that slight circuit modifications are made to accommodate their different operating characteristics to provide suitable performance.

If the resistor 142 is used as the circuit option, the current drawn by the collector of the transistor 146 is proportional to the voltage of the potential source 149. Similarly, the charging rate on the capacitor 126 is directly proportional to the voltage of the potential source 149. Therefore, the charging time, which is the interval from when the transistor 146 starts conducting until the critical voltage is developed across the capacitor 126, is inversely proportional to the charging rate of the capacitor 126. The duration of the output pulse obtained from the collector of the transistor 117 is determined by the length of the charging interval on capacitor 126. Therefore, the duration of the output pulse obtained from the pulse circuit 111 is now inversely proportional to the voltage of the potential source 149. Other devices may also be used as a circuit option. For example, a thermistor may be used to give an output pulse with a duration related to its temperature. In other applications, any one of a number of different type devices may be used to sense other physical phenomena and to control the duration of the output pulse as a source of information.

Another function of the pulse circuit 111 shall now be explained. If the trigger source 112 continually applies a triggering current to the transistor 117, the transistor 117 becomes conductive, causing the transistor 146 also to become conductive and develop a potential across the capacitor 126 which will again be discharged by the voltage-sensitive switch 117. The cycle will continually repeat itself as long as the triggering current from the trigger source 113 is sufficient to turn the transistor 117 on but is less than the holding current of the voltage-sensitive switch 127. The upper limit of the repetition rate or frequency of the output pulses is largely determined by the value of the resistor 124, which is much lower than the value of resistor 118. The lower value of the resistor 124 provides a low resistance discharge path and increases the frequency of the output pulses. The polarity of the connection of the diode 123 into the circuit is selected to pass a current only on the discharge cycle of the capacitor 126, and to isolate the low-resistance path of the resistor 124 during the charge portion of the cycle.

Figure 2:
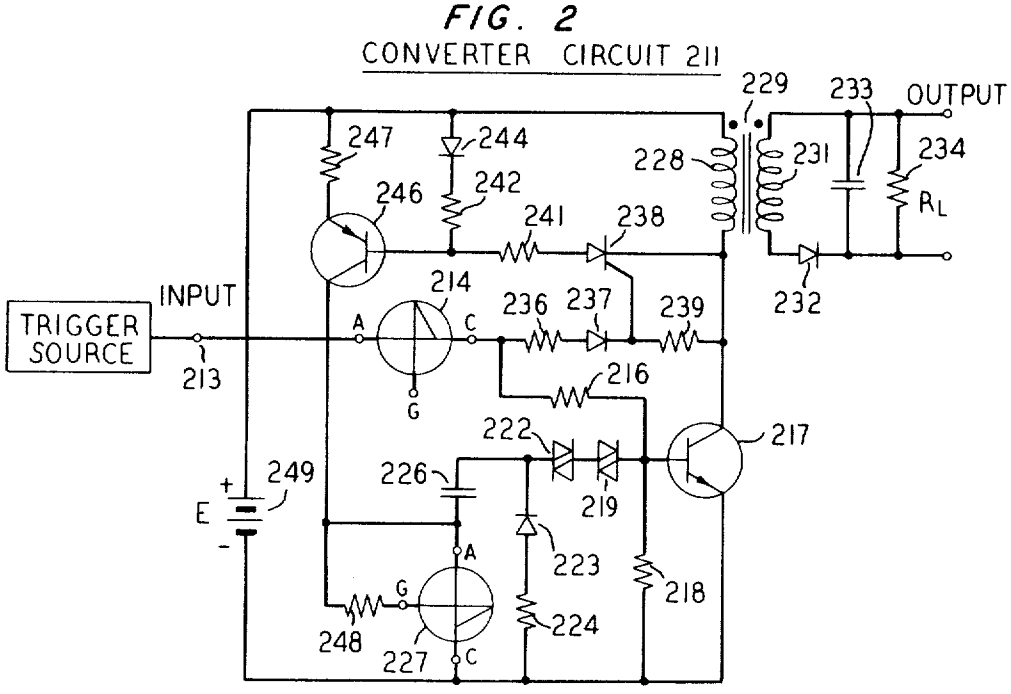
FIG. 2 is a second illustrative embodiment of a converter circuit of the invention.

In FIG. 2 is shown a converter circuit 211 which is a modified version of the basic pulse circuit 111 shown in FIG. 1. Each of the circuit components in the converter circuit 211 that has the same last two digits as the components in the pulse circuit 111 of FIG. 1 performs the equivalent function for FIG. 2. In addition to the basic circuit (which operates in the same manner as the pulse circuit 111 of FIG. 1, except as shall be explained hereinafter), the circuit modifications of FIG. 2 comprise a voltage-sensitive switch 214 connected between the input terminal 213 and a resistor 216 which is connected to the base of the transistor 217, two varistors 219 and 222 which are connected in series from the base of the transistor 217 to the junction of the diode 223 and the capacitor 226, and an output pulse transformer 229 which has its primary winding 228 connected between the collector of the transistor 217 and the potential source 249 to bias the collector of the transistor 217. The transformer 229 has its secondary winding 231 connected through a diode 232 across the parallel combination of the capacitor 233 and a resistor 234. The final modification of the circuit comprises a voltage-divider network which includes the series circuit of a resistor 236, a diode 237 and a resistor 239 connected between the voltage-sensitive switch 214 and the collector of the transistor 217. The junction of the resistor 239 and the diode 237 is connected to the gate terminal of a silicon-controlled rectifier 238 which is in series with the resistor 241 and connected to the collector of the transistor 217.

The voltage-sensitive switch 214 in the input of the converter circuit 211 provides an abrupt turnon characteristic when the triggering signal has a gradually increasing forward slope. The abrupt turnon characteristic provided by the voltage-sensitive switch 214 is necessary to prevent the transistor 217 from being turned on gradually and drawing a collector current through the primary 228 of the transformer 229 which would produce an insufficient potential to start conduction of the transistor 246. The main function of the transformer 229 is to provide impedance matching between the transistor 217 and the load 234 and thereby increase the efficiency of the circuit. The transformer 229 also provides isolation between the secondary 231 and the primary 228 which is further enhanced by the series connection of the diode 232. In the primary circuit of the winding 228, the silicon-controlled rectifier 238 also increases noise immunity of the circuit by providing isolation between the collector of the transistor 217 and the base of the transistor 246. Although the basic pulse circuit 111 of FIG. 1 is not particularly susceptible to noise, the addition of the output pulse transformer 229 in the converter circuit 211 of FIG. 2 increases the noise susceptibility and the presence of the silicon-controlled rectifier 238 mitigates this condition. The silicon-controlled rectifier 238 only becomes conductive when the voltage-sensitive switch 214 becomes conductive and thus provides the necessary coupling between the transistors 217 and 246 to insure the saturation of the transistor 217. The presence of the two varistors 219 and 222 provides a potential drop which allows a larger potential to be developed across the capacitor 226 before the critical voltage of the voltage-sensitive switch 227 is reached. Thus, the presence of the two varistors 219 and 222 allows some latitude for the selection of a voltage-sensitive switch with the proper critical voltage. Varistors 219 and 222 also provide a voltage-divider action to protect the base-emitter junction of the transistor 217 during the discharge of the capacitor 226.

The converter circuit 211 utilizes a resistor 242 as the circuit option. The converter circuit 211 also utilizes a single potential source, namely, the potential source 249. Furthermore, the resistor 242 controls the collector current of the transistor 246, as was previously explained, to provide an output pulse with a duration inversely related to the value of the voltage level of the potential source 249. When the values of the circuit components are selected properly, the circuit has the characteristic of maintaining a predetermined energy content in the output pulse independently of the voltage variations of the potential source 249.

In all cases it is to be understood that the foregoing described arrangements are merely illustrative of a small number of the many possible applications of the principles of the invention. Numerous and varied other modifications of pulse circuits in accordance with these principles may readily be devised by those skilled in the art without departing from the spirit and scope of the invention.

What is claimed is:

1. A pulse circuit comprising:

a first transistor having a load connected to the collector terminal;

a source of triggering current connected in circuit with the base terminal of said first transistor whereby the triggering current from said source switches said first transistor into a conduction state to supply an output pulse to said load;

a second transistor having the base terminal in circuit with the collector terminal of said first transistor, the emitter terminal of said second transistor being in circuit with a potential source, and the collector terminal of said second transistor being in circuit with the base terminal of said first transistor whereby the collector current of said first transistor turns on said second transistor and the collector current of said second transistor aids the switching of said first transistor into the conduction state; and means for controlling the duration of the output pulse comprising capacitive means connected between the base terminal of said first transistor and the collector terminal of said second transistor, and a voltage-sensitive switching device connected to the collector terminal of said second transistor and the emitter terminal of said first transistor, said switching device becoming conductive when the charge on said capacitive means reaches a predetermined level, thereby discharging said capacitive means through the base-emitter junction of said first transistor and reversing the bias across said junction causing the termination of the conduction state of said first transistor.

2. The pulse circuit of claim 1 wherein the means for controlling the duration of the output pulse further comprises: a voltage divider circuit having one terminal connected to said potential source, a second terminal connected to the collector terminal of the first transistor, and a third terminal connected to the base terminal of said second transistor to furnish a portion of the potential from said potential source to bias the base terminal of said second transistor; and a resistor connected between said potential source and the emitter terminal of said second transistor, the combination of said resistor and voltage divider circuit determining the collector current of said second transistor and establishing an inverse relationship between the duration of the output pulse and the voltage of said potential source.

3. The pulse circuit of claim 1 wherein the means for controlling the duration of the output pulse further comprises a voltage regulator diode having one terminal in circuit with said potential source and the other terminal of said voltage regulator diode connected to the base terminal of said second transistor and a resistor connected from said other terminal to the collector terminal of said first transistor for drawing a current through said voltage regulator diode to bias the base terminal of said second transistor thereby regulating the collector current of said second transistor to maintain an output pulse of a predetermined duration.

4. The pulse circuit of claim 3 wherein the means for controlling the duration of the output pulse further comprises a diode connected between said voltage regulator diode and potential source to provide temperature compensation for the base bias of said second transistor thereby making the collector current of said second transistor substantially constant during temperature changes.

5. The pulse circuit of claim 1 wherein the circuit between the base terminal of said first transistor and said source comprises a second voltage-sensitive switch to provide an abrupt turnon characteristic for said first transistor when the current from said source gradually increases.

6. The pulse circuit of claim 1 wherein an output transformer has a primary winding connected to the collector terminal of said first transistor and a secondary winding connected to a series diode and a capacitor connected in parallel with said load to match the output impedance of said first transistor to the impedance of said load and to provide isolation between said pulse circuit and said load.

7. The pulse circuit of claim 5 wherein the collector terminal of said first transistor is connected to a voltage divider circuit comprising a first resistor having a first terminal connected to the collector terminal of said first transistor, and a second resistor and a diode connected in series between said second voltage-sensitive switch and the other terminal of said first resistor, the junction of said diode and said first resistor connected to the gating terminal of a silicon-controlled rectifier and said silicon-controlled rectifier connected between the collector terminal of said first transistor and the base circuit of said second transistor to isolate said first transistor from the second transistor except when a triggering current turns on said first transistor thereby increasing the noise immunity of said pulse circuit.

* * * * *